(12) United States Patent
Prasad et al.

(10) Patent No.: US 7,209,620 B2
(45) Date of Patent: Apr. 24, 2007

(54) DISPERSION OPTIMIZED FIBER HAVING HIGHER SPOT AREA

(75) Inventors: Shashikant Prasad, Maharastra (IN); Sthitadhi Das, Maharastra (IN); Nageswaran Senthil Kumar, Maharastra (IN); Sanjeet Bhatia, Maharastra (IN); Salaj Sinha, Maharastra (IN); Pankaj Khanna, Maharastra (IN)

(73) Assignee: Sterlite Optical Technologies Limited, Aurangabad, Maharastra (IN)

( * ) Notice: Subject to any disclaimer, the term of this patent is extended or adjusted under 35 U.S.C. 154(b) by 0 days.

(21) Appl. No.: 10/763,403

(22) Filed: Jan. 22, 2004

(65) Prior Publication Data
US 2005/0058418 A1   Mar. 17, 2005

(30) Foreign Application Priority Data
Jan. 27, 2003   (IN) .......................... 96/MUM/2003

(51) Int. Cl.
*G02B 6/02* (2006.01)
*G02B 6/16* (2006.01)
*G02B 6/18* (2006.01)
*G02B 6/22* (2006.01)

(52) U.S. Cl. ...................... 385/129; 385/123; 385/124; 385/126; 385/127

(58) Field of Classification Search ................ 385/128
See application file for complete search history.

(56) References Cited

U.S. PATENT DOCUMENTS

| | | | | |
|---|---|---|---|---|
| 4,852,968 A | * | 8/1989 | Reed ........................... | 385/127 |
| 5,361,319 A | * | 11/1994 | Antos et al. ................. | 385/123 |
| 5,905,838 A | * | 5/1999 | Judy et al. ................... | 385/123 |
| 6,134,367 A | * | 10/2000 | Jones et al. .................. | 385/124 |
| 6,212,322 B1 | * | 4/2001 | Ma et al. ...................... | 385/123 |
| 6,400,877 B1 | * | 6/2002 | Kato et al. ................... | 385/123 |
| 6,421,490 B1 | * | 7/2002 | Liu .............................. | 385/127 |
| 6,442,320 B1 | * | 8/2002 | Danziger et al. ............ | 385/123 |
| 6,445,864 B2 | * | 9/2002 | Jiang et al. .................. | 385/127 |
| 6,477,306 B2 | * | 11/2002 | Kato et al. ................... | 385/123 |
| 6,498,887 B1 | * | 12/2002 | Gruner-Nielsen et al. .. | 385/123 |

(Continued)

FOREIGN PATENT DOCUMENTS

WO    WO 02/088803 A2 * 11/2002

*Primary Examiner*—Frank G. Font
*Assistant Examiner*—Ryan Lepisto
(74) *Attorney, Agent, or Firm*—Ladas & Parry LLP (57) ABSTRACT

A dispersion optimized fiber having higher spot area comprising a center core region, a cladding region, a ring core region and an outer glass region is provided, wherein the cladding is provided onto the outer periphery of the center core, and the ring core is provided onto the outer periphery of the cladding, and the outer glass region surrounds the ring core region, and the center core and the ring core have refractive indices higher than the outer glass region and the cladding region has lower refractive index than the outer glass region, and the refractive indices are constrained by the equation $n_1 > n_3 > n_4 > n_2$. In accordance with the preferred embodiment, the cladding region is divided into two regions—inner cladding region and an outer cladding with the ring core disposed therebetween, wherein the inner cladding is provided onto the outer periphery of the center core, and the ring core is provided between the inner cladding and the outer cladding is provided onto the outer periphery of the ring core, and the outer glass region surrounds the outer cladding, and the refractive indices are constrained by the equation:

$$n_1 > n_3 > n_5 > n_2 = n_4.$$

19 Claims, 6 Drawing Sheets

U.S. PATENT DOCUMENTS

| | | | |
|---|---|---|---|
| 6,587,627 B2 * | 7/2003 | Saitou et al. ............... | 385/127 |
| 6,650,814 B2 * | 11/2003 | Caplen et al. .............. | 385/127 |
| 6,879,764 B2 * | 4/2005 | Changdar et al. .......... | 385/127 |
| 6,904,217 B2 * | 6/2005 | Kalish et al. ............... | 385/127 |
| 2002/0001444 A1 * | 1/2002 | Hirano et al. .............. | 385/123 |
| 2002/0054743 A1 * | 5/2002 | Montmorillon et al. ..... | 385/124 |
| 2002/0067903 A1 * | 6/2002 | Fleury et al. ............... | 385/123 |
| 2002/0076186 A1 * | 6/2002 | de Montmorillon et al. ......................... | 385/123 |
| 2002/0164139 A1 * | 11/2002 | Saitou et al. ............... | 385/127 |
| 2003/0113084 A1 * | 6/2003 | Knudsen et al. ............ | 385/127 |
| 2003/0133678 A1 * | 7/2003 | Mukasa ...................... | 385/123 |
| 2003/0156809 A1 * | 8/2003 | Tsukitani et al. ........... | 385/123 |
| 2003/0169988 A1 * | 9/2003 | Matsuo et al. ............. | 385/127 |
| 2003/0185531 A1 * | 10/2003 | Lysiansky et al. .......... | 385/127 |
| 2004/0028359 A1 * | 2/2004 | Tirloni et al. ............... | 385/123 |
| 2004/0067034 A1 * | 4/2004 | Rosenblum et al. ........ | 385/127 |

* cited by examiner

DISPERSION OPTIMIZED FIBER HAVING HIGHER SPOT AREA

TECHNICAL FIELD OF THE INVENTION

The present invention relates to a fiber having low dispersion, low dispersion slope and higher spot area, particularly it relates to a dispersion-optimized fiber having low dispersion, low dispersion slope and higher spot area to provide low dispersion slope and high effective area between 1530 to 1565 nm (C-band) and 1565 to 1625 nm (L-band) transmissions. More particularly, it relates to a single mode dispersion optimized fiber, which is suitable for transmission of more channels of higher bandwidth over longer distance with more uniform chromatic dispersion and with lower power density over the third and forth window and yet has optimized mode field diameter to achieve low bending induced loss at 1550 nm and at the more critical 1625 nm wavelength.

BACKGROUND ART OF THE INVENTION

Over the last decade, the optical fibers have been developed and installed as the backbone of interoffice networks for voice, video and data transmission. These are becoming important with growing and expanding telecommunication infrastructure. Their importance is further increasing because of their high bandwidth applicability. The higher bandwidth demand is further increasing exponentially with time because of rapid growth of information technology.

The network capacity optical communication in the world is exploding. The growing bandwidth demand can be met by use of the new generation of dense wavelength division multiplexer, hereinafter referred to as DWDM, approach with low dispersion single mode optical fibers in the 1530–1565 nm (C-band) and in the 1565–1625 nm (L-band) wavelength ranges. The requirements of the fiber have had to change to support these advances, especially the requirement for the higher spot area and the amount and uniformity (slope) of chromatic dispersion across these wavelengths. The DWDM approach enhances the effective data rate of an optical fiber link by increasing the number of wavelength channels within the wavelength band.

Conventionally, the multi-mode fiber at wavelength of 850 nm were used, which were replaced by single mode fibers with zero dispersion wavelength near 1310 nm. The single mode or monomode optical fibers have greater bandwidth than that of the multimode fibers.

Therefore, the research has been directed towards the development of the single mode fibers, as these fibers were observed to have lower attenuation between the wavelength range from 1300 nm to 1550 nm.

However, when single wavelength moved through 1550 nm window for lower attenuation, the single mode fibers were observed to have very high dispersion.

The major disadvantage of the known single mode fibers with high dispersion at 1550 nm was that, it obstructed higher bit rate is transmission. This disadvantage of single mode fibers has been overcome by the improved single mode fibers, known as dispersion shifted fibers, which have zero dispersion even when the wavelength shifted to 1550 nm.

The theoretical analysis reveals that a single mode fiber having Low dispersion and low dispersion slope with higher effective area is most desirable for high capacity DWDM, as referred hereinabove, transmission. However, the dispersion shifted fibers used for long distance systems in the prior art have higher dispersion which promotes poor DWDM performance. The dispersion flattened fiber which specify the dispersion magnitude less than 2 ps/nm.km between 1.3 to 1.6 μm have zero dispersion region within the DWDM window. This result is strong four wave mixing, which prevents good DWDM performance.

Ideally the dispersion of an optical fiber should have a constant value over the entire wavelength-operating region. However, the dispersion of fibers varies with the wavelength as the refractive index varies with the wavelength. Their dispersion slope $S_0$ quantifies this variability. The smaller the slope the lesser the dispersion varies with the wavelength. Another advantage of the low dispersion and low dispersion slope fiber is that its small dispersion allows its minimum dispersion to be increased to better suppress the Four Wave Mixing non-linearity, while still keeping the fiber minimum dispersion small enough for the signals to travel to longer distances with minimum need for dispersion and dispersion slope compensation.

It has been observed that the bandwidth or the capacity of the Lightwave systems can be expanded in different ways. A) Increasing the number of wavelengths within the fiber (DWDM approach). B) Transmitting at a faster speed (Time division multiplexing) or C) By increasing number of fibers within the cable. Power requirements of the optical amplifier limits the more fiber counts within the cable.

This is the fact that systems push the performance to the limit. Hence, the roll of a fiber in the system becomes critical. As stated hereinabove, the fiber characteristic should remain under control, particularly the dispersion must be balanced between the requirement for compensation and the suppression of non-linear effects, the effective area must be larger to reduce the non-linear effects without affecting the fiber performance, the dispersion slope must be low enough to reduce the inter channel spacing i.e., for all channels to propagate with an extremely low errors in bit rate, etc.

The increasing complexity of the demands on the fiber makes the designer to think further to re-optimize the refractive index profile. This requires thinking to have more complex designs. However, the complex designs are very sensitive to the manufacturing processes The optical and material physics limits the combination of the above-said parameters, which can be achieved. The end product is the compromise, where each parameter is optimized to the best value, which can be achieved without adversely affecting performance of the critical attributes and system requirements. Insensitive system modeling is done with each varied parameters to understand its impact.

The parameters, like refractive index and radius of each part of the fibre, like centre core, cladding(s), ring core(s) and outer core, and the relationship between refractive index and radius of such parts of the fibre, and number of cores and claddings decide the characteristic properties of thus obtained fiber and the applications of thus obtained fiber.

Therefore, the fibers known in the art are distinguished by way of their characteristic properties, which in-turn are decided by various parameters as stated herein above. The fibers as known in the prior art either have low non-linearity but high bend loss or have low bend loss but less effective area or may have higher non-linearity and higher bend loss or may have non-uniform chromatic dispersion over the third and fourth window or high dispersion slope, that is the fibre will not have optimum characteristic properties and will sacrifice one of the property for achieving another property.

It has been observed that the dispersion and dispersion slope varies with the wavelength and refractive index varies with the wavelength.

Therefore, in view of variation of dispersion and dispersion slope with the wavelength and variation of refractive index with the wavelength constant efforts are being made to develop optical fibers which have optimum dispersion and dispersion slope and yet having higher spot area and such a refractive index profile and the configuration which is easy to be achieved and accordingly it is easy to fabricate the desired fiber which is suitable in as wider range of the wavelength as possible.

Therefore, the inventors of the present invention have made an attempt to develop the fiber, which will have optimum characteristic properties, that is which will not sacrifice one of the characteristic property to achieve another characteristic property.

Therefore, there is a need to develop a dispersion and effective area optimized fiber, particularly a single mode dispersion optimized fiber having as far as possible optimum low dispersion slope between 1530 to 1565 nm (C-band) and 1565 to 1625 nm (L-band) transmissions along with higher effective area. More particularly, the need is to develop a fiber which is suitable for transmission of higher bandwidth over longer distance with more uniform chromatic dispersion over the third and fourth window and yet has very high effective area and also to achieve low bending induced loss at 1550 nm and at the more critical 1625 nm wavelength.

SUMMARY OF THE INVENTION

Accordingly, this is an object of the present invention to make a complete disclosure of a fiber which has low dispersion and low dispersion slope particularly between 1530 and 1565 nm wavelengths.

The another object of the present invention is to make a complete disclosure of the fiber which has low dispersion slope and are still suitable for long haul transmissions.

Still another object of the present invention is to make a disclosure of the fiber which has higher effective area at 1550 nm wavelength, but also has optimized cut-off wavelength and mode field diameter.

Yet another object of the present invention is to make a disclosure of the fibers which not only have high level of bend resistance but also have minimized non-linearities with optimum chromatic dispersion.

The other objects and the preferred embodiments of the present invention will become more apparent from the following description when read in combination with the accompanying drawings which are not intended to limit the scope of the present invention.

In accordance with the critical designing evaluation and the analysis carried out by the present inventors, it has been observed that the main drawbacks and limitations of the prior art can be overcome by a fiber which can have chromatic dispersion 1.8 to 6.0 ps/nm.km and 4.0 to 11 ps/nm.km over the operating wavelength 1530 to 1565 nm (C-band) and 1565 to 1625 nm (L-band) respectively, an effective area of typically 72 micron$^2$ and a minimum dispersion slope of 0.075 ps/nm$^2$.km over the said wavelength regions. Therefore, the present invention makes a disclosure of a novel fiber having such a refractive index profile and configuration which is not only easy to be achieved, but also easy to be fabricated, wherein the said fiber will have chromatic dispersion, effective area and dispersion slope characteristics in or closer to the said ranges or values.

Accordingly, the present invention relates to a dispersion optimized fiber having higher spot area comprising a center core region, a cladding region, a ring core region and an outer glass region, wherein the center core and the ring core have refractive indices higher than the outer glass region and the cladding region has lower refractive index than the outer glass region, and the refractive indices are constrained by the following equation:

$$n_1 > n_3 > n_4 > n_2$$

and values of the refractive indices of the regions are constrained by the following equations to make the fiber having the low slope, the low dispersion and the higher effective area during the C and the L band transmissions:

$$0.008 > (n_1 - n_4) > 0.007$$

$$0.0018 > (n_3 - n_4) > 0.0014$$

$$-0.0005 > (n_2 - n_4) > -0.0007$$

wherein $n_1$, $n_2$, $n_3$ and $n_4$ represents the refractive index of the center core region 1, cladding region 2, ring core region 3 and outer glass region 4 respectively.

The present invention also relates to a dispersion optimized fiber having higher spot area comprising a center core, an inner cladding, a ring core, an outer cladding and the outer glass region, and the center core and the ring core have the refractive indices higher than the outer glass region, and the inner cladding region and the outer cladding region have the lower refractive indices than the outer glass region, and are constrained by the following equation:

$$n_1 > n_3 > n_5 > n_2 = n_4$$

and values of the refractive indices of the regions are constrained by the following equations to make the fiber having the low slope, the low dispersion and the higher effective area during the C and the L band transmissions:

$$0.008 > (n_1 - n_5) > 0.007$$

$$0.0018 > (n_3 - n_5) > 0.0014$$

$$-0.0005 > (n_2 - n_5) > -0.0007$$

$$-0.0005 > (n_4 - n_5) > -0.0007$$

wherein $n_1$, $n_2$, $n_3$, $n_4$ and $n_5$ represents the refractive indices of the center core region, the inner cladding region, the ring core region, the outer cladding region and the outer glass region respectively.

The other preferred embodiments and the advantages of the present invention will be more apparent from the following description when it is read in conjunction with the accompanying figures which are not intended to limit the scope of the present invention.

BRIEF DESCRIPTION OF THE FIGURES

The nature of the present invention is described with the help of accompanied figures, which arc incorporated with a view to demonstrate the invention and its best mode of operation and arc not intended to limit the scope of the present invention. The present invention is however, limited by the relation of refractive Indices and their respective values and/or by the radii of various parts of the disclosed fiber as elaborated in the following description.

DETAILED DESCRIPTION OF THE INVENTION

In accordance with the first embodiment of this invention, the disclosed fiber comprises of four regions—the center core region 1, the cladding region 2, the ring core region 3 and the outer glass region 4. As shown in the accompanying FIG. 2a, this fiber comprises of a center core 1, the cladding 2, a ring core 3 and the outer glass region 4, wherein the cladding 2 is provided onto the outer periphery of the center core 1, and the ring core 3 is provided onto the outer periphery of the cladding 2, and the outer glass region 4 surrounds the ring core region 3 [FIG. 2a].

In accordance with this embodiment of the present invention, the center core 1 and the ring core 3 have refractive indices higher than the outer glass region 4. The refractive index of the cladding region 2 is lower than the outer glass region 4 [FIG. 2b and equation 1].

$$n_1 > n_3 > n_4 > n_2 \quad (1)$$

The refractive indices of various regions—the center core region 1, the cladding region 2, the ring core region 3, the outer glass region 4 of the fiber in accordance with the first embodiment of this invention are identified by the symbols $n_1$, $n_2$, $n_3$ and $n_4$ respectively. These refractive indices are constrained by the following equations 2–4 to make the fiber having the low slope, the low dispersion and the higher effective area during the C and the L band transmissions:

$$0.008 > (n_1 - n_4) > 0.007 \quad (2)$$

$$0.0018 > (n_3 - n_4) > 0.0014 \quad (3)$$

$$-0.0005 > (n_2 - n_4) > -0.0007 \quad (4)$$

Figure 1:
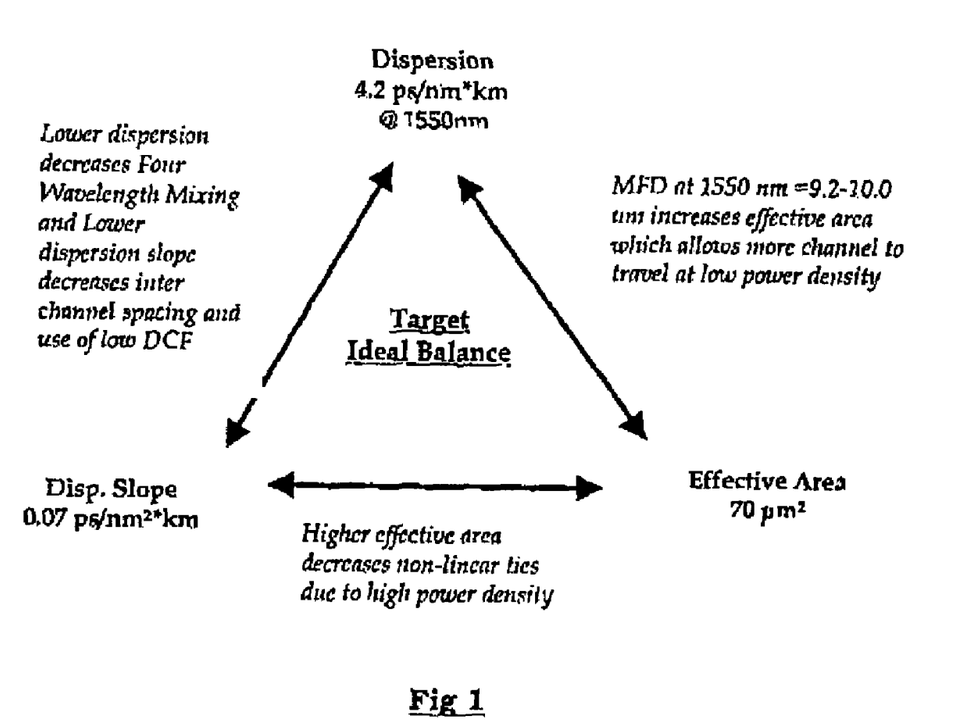
FIG. 1 shows the key attributes of the fiber in accordance with the present invention.
Figure 2A:
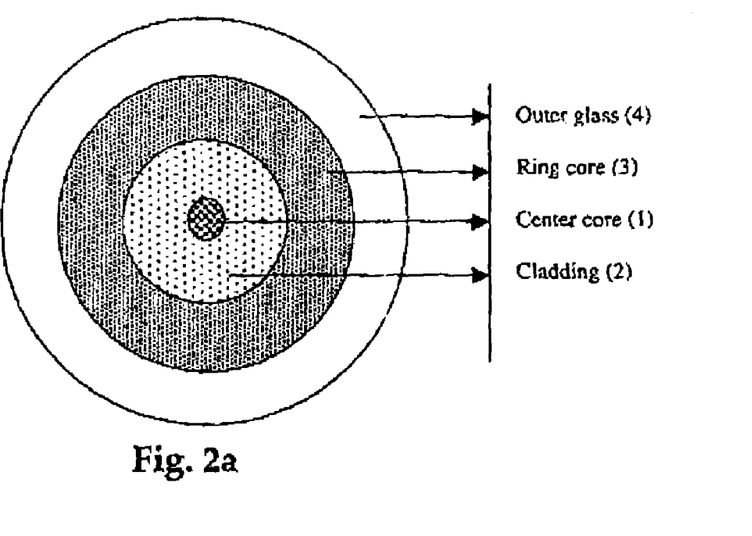
FIG. 2a shows a cut section of the optical fiber shown in FIG. 1 in accordance with one of the preferred embodiments of the present invention.
Figure 2B:
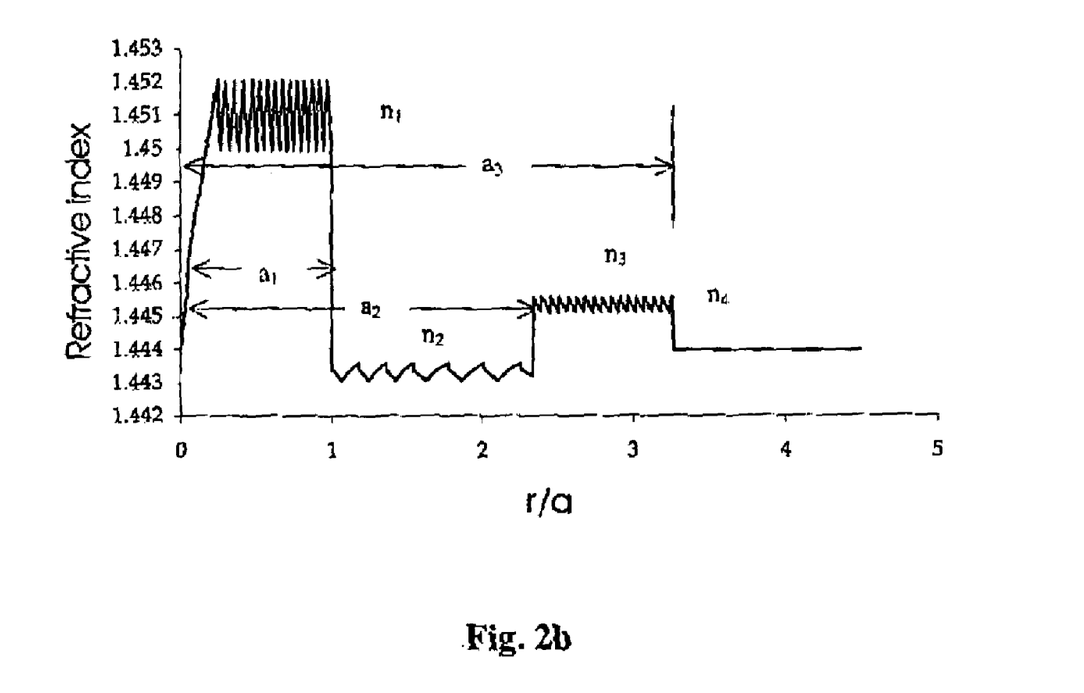
FIG. 2b shows the refractive index profile of the optical fiber shown in FIG. 2a in accordance with the present invention.

The optical fiber in accordance with this embodiment as disclosed hereinabove and illustrated in accompanying FIGS. 2a and 2b is insensitive to micro bend loss and dispersion slope no more than 0.08 ps/nm².km.

In a specific embodiment of the present invention the optical fiber in accordance with the first embodiment of this invention as shown in FIG. 2a has the following relationships between its refractive indices:

$$(n_1 - n_4) = \text{about } 0.007 \quad (5)$$

$$(n_3 - n_4) = \text{about } 0.0016 \quad (6)$$

$$(n_2 - n_4) = \text{about } -0.0006 \quad (7)$$

The optical fiber [FIG. 2a] in accordance with the first embodiment of this invention is also identified by the radius of each of its regions, that is of the center core region 1, the cladding region 2, the ring core region 3 and the outer glass region 4. The radii of these regions are identified by the symbols $a_1$, $a_2$, $a_3$ and $a_4$ respectively, In accordance with this embodiment of the present invention, these radii are so selected that the dispersion and the chromatic dispersion slope, and the bend loss during the C- and the L-band transmissions are in the desired range, and according to this invention these radii of the first embodiment are restricted by the following equations 8–10:

$$a_1 = \text{about } 2.7 \, \mu m \quad (8)$$

$$a_2 = \text{about } 6.3 \, \mu m \quad (9)$$

$$a_3 = \text{about } 8.8 \, \mu m \quad (10)$$

In one illustrated embodiment, the refractive index profile of the optical fiber in accordance with the first embodiment of this invention as shown in FIG. 2a comprises single annular ring 2 of germanium and fluorine doped material between a germanium doped center core 1 and ring core 3. The outer pure glass 4 is provided onto the outer periphery of the germanium doped ring core 3.

In accordance with the first embodiment of this invention, the optical fiber as shown in FIG. 2a having a refractive index profile and the relative radius of each of the said part as described hereinabove has been identified having following characteristics:

| | |
|---|---|
| Attenuation at 1550 nm | ≦0.22 dB/Km |
| Dispersion at 1530 to 1565 nm | 2.2 to 6.0 ps/nm · km |
| Dispersion at 1565 to 1625 nm | 4.0 to 11 ps/nm · km |
| Dispersion slope (typical) | 0.07 ps/nm² · km |
| Polarization Mode Dispersion (PMD) | ≦0.1 ps/km$^{0.5}$ |
| Mode Field Diameter (MFD) | 9.6 ± 0.4 μm |
| Cut off wavelength (cable) | ≦1280 nm |
| Core concentricity | <0.6 μm |
| Effective area (typical) | 70 micron² |
| Micro bending (Pin array) | <0.05 dB at 1550 and 1625 nm |
| Macro bending (single 32 mm mandrel and 100 turns at 60 mm mandrel) | <0.5 dB at 1550 and 1625 nm |
| Proof test | 100 kpsi |

In accordance with the second embodiment of this invention, the cladding region 2 is divided into two regions 2 and 4 with the ring core 3 disposed therebetween and the outer glass region is provided on the outer periphery of the outer cladding 4 as an outer glass region 5. As shown in the accompanying FIG. 4a, this fiber comprises of a center core 1, an inner cladding 2, a ring core 3, an outer cladding 4 and the outer glass region 5, wherein the inner or the first cladding 2 is provided onto the outer periphery of the center core 1, and the ring core 3 is provided between the inner or first cladding 2 and the outer or second cladding 4, that is the ring core 3 is provided onto the outer periphery of the inner or first cladding 2, and the outer or the second cladding 4 is provided onto the outer periphery of the ring core 3, and the outer glass region 5 surrounds the outer or the second cladding 4 [FIG. 4a].

In accordance with the second embodiment of this invention, the center core 1 and the ring core 3 have refractive indices higher than the outer glass region 5. The refractive indexes of the inner cladding region 2 and the outer cladding region 4 are lower than the outer glass region 5 [FIG. 4b and equation 11]. In accordance with the present invention the refractive indices of the inner cladding region 2 and the outer cladding region 4 are equal.

$$n_1 > n_3 > n_5 > n_2 = n_4 \tag{11}$$

The refractive indices of various regions—the center core region 1, the inner cladding region 2, the ring core region 3 provided between the inner and outer cladding regions 2 and 4, the outer cladding region 4, and the outer glass region 5 of the fiber in accordance with the second embodiment of this invention are identified by the symbols $n_1$, $n_2$, $n_3$, $n_4$, and $n_5$ respectively. These refractive indices are constrained by the following equations 12–15 to make the fiber having the low slope, the low dispersion and the higher effective area during the C and the L band transmissions:

$$0.008 > (n_1 - n_5) > 0.007 \tag{12}$$

$$0.0018 > (n_3 - n_5) > 0.0014 \tag{13}$$

$$-0.0005 > (n_2 - n_5) > -0.0007 \tag{14}$$

$$-0.0005 > (n_4 - n_5) > -0.0007 \tag{15}$$

Figure 4A:
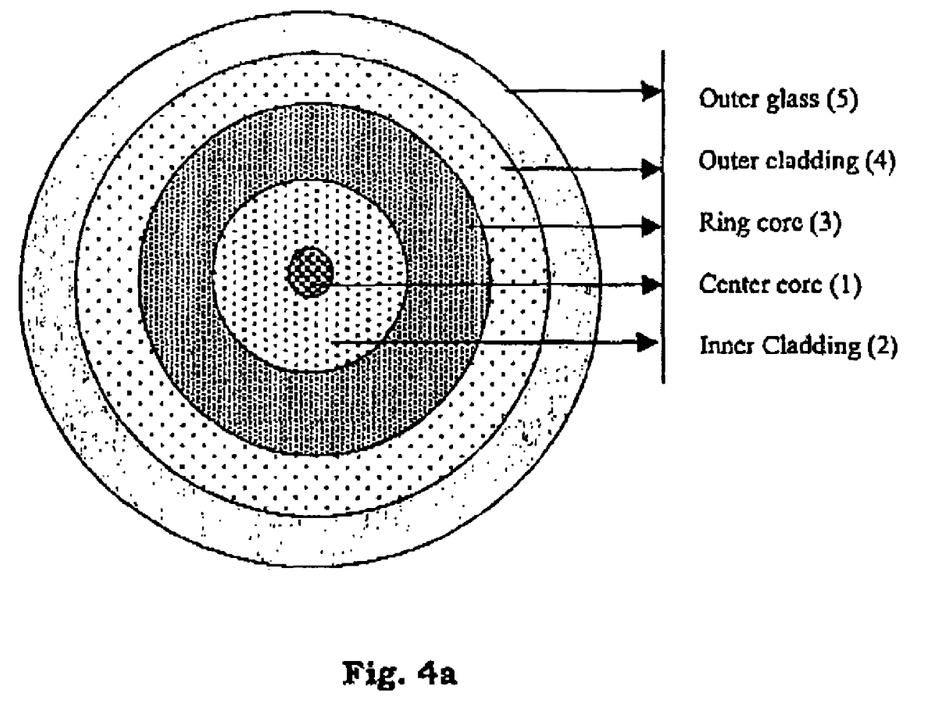
FIG. 4a shows a cut section of the optical fiber shown in FIG. 1 in accordance with another preferred embodiment of the present invention.
Figure 4B:
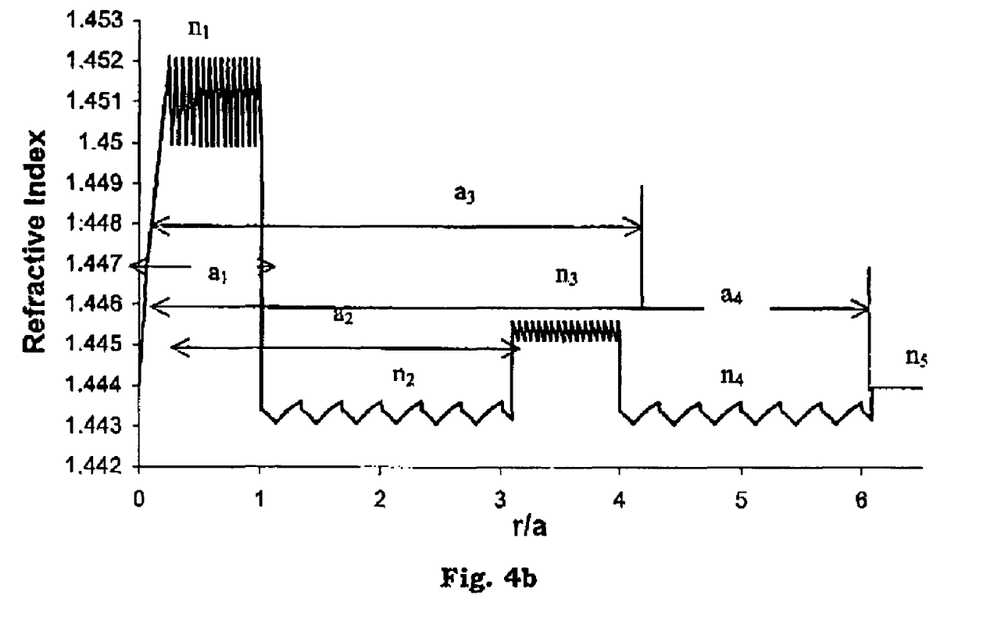
FIG. 4b shows the refractive index profile of the optical fiber shown in FIG. 4a in accordance with the present invention.

The optical fiber in accordance with the second embodiment of this invention as disclosed hereinabove and illustrated in accompanying FIGS. 4a and 4b is insensitive to micro bend loss and dispersion slope no more than 0.08 ps/nm².km.

In a specific embodiment of the present invention the optical fiber in accordance with the second embodiment of this invention as shown in FIG. 4a has the following relationships between its refractive indices:

$$(n_1 - n_5) = \text{about } 0.007 \tag{16}$$

$$(n_3 - n_5) = \text{about } 0.0016 \tag{17}$$

$$(n_2 - n_5) = \text{about } -0.0006 \tag{18}$$

$$(n_{4\ i\ -n5}) = \text{about } -0.0006 \tag{19}$$

The optical fiber [FIG. 4a] in accordance with the second embodiment of this invention is also identified by the radius of each of its regions, that is of the center core region 1, the inner cladding region 2, the ring core region 3 provided between the inner and the outer cladding regions 2 and 4, the outer cladding region 4 and the outer glass region 5. The radii of these regions are identified by the symbols $a_1$, $a_2$, $a_3$, $a_4$, and $a_5$ respectively. In accordance with this embodiment of the present invention, these radii are so selected that the dispersion and the chromatic dispersion slope, and the bend loss during the C- and the L-band transmissions are in the desired range, and according to this invention these radii of the second embodiment are restricted by the following equations 20–23:

$$a_1 = \text{about } 2.7\ \mu\text{m} \tag{20}$$

$$a_2 = \text{about } 6.3\ \mu\text{m} \tag{21}$$

$$a_3 = \text{about } 8.8\ \mu\text{m} \tag{22}$$

$$a_4 = \text{about } 10.8\ \mu\text{m} \tag{23}$$

In one illustrated embodiment, the refractive index profile of the optical fiber in accordance with the second embodiment of this invention as shown in FIG. 4a comprises two annular rings 2 and 4 of germanium and fluorine doped material between a germanium doped center core 1 and ring core 3. The outer pure glass 5 is provided onto the outer periphery of the germanium and fluorine doped outer cladding 4.

In accordance with the second embodiment of this invention, the optical fiber as shown in FIG. 4a having a refractive index profile and the relative radius of each of the said part as described hereinabove has been identified having following characteristics:

| | |
|---|---|
| Attenuation at 1550 nm | ≦0.25 |
| Dispersion at 1530 to 1565 nm | 1.8 to 6.0 ps/nm · km |
| Dispersion at 1565 to 1625 nm | 4.0 to 11 ps/nm · km |
| Dispersion slope (typical) | 0.07 ps/nm² · km |
| Polarization Mode Dispersion (PMD) | ≦0.1 Ps/km$^{0.5}$ |
| Mode Field Diameter (MFD) | 9.6 ± 0.4 μm |
| Cut off wavelength (cable) | ≦1480 nm |
| Core concentricity | <0.6 μm |
| Effective area (typical) | 70 micron² |
| Micro bending (Pin array) | <0.05 dB at 1550 and 1625 nm |
| Macro bending (single 32 mm mandrel and 100 turns at 60 mm mandrel) | <0.5 dB at 1550 and 1625 nm |
| Proof test | 100 kpsi |

Figure 6:
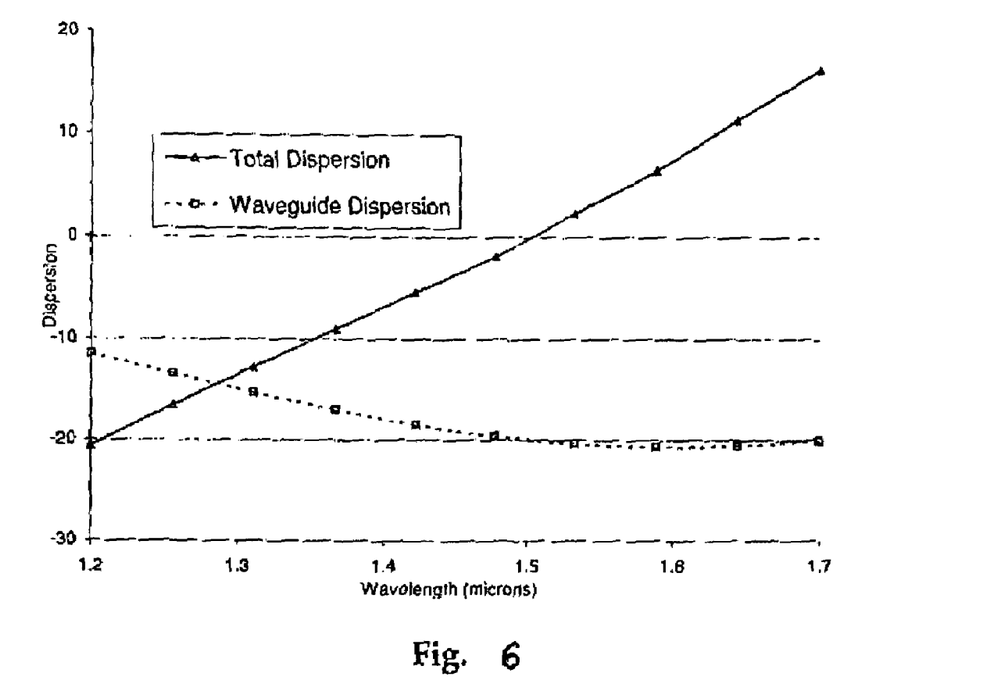
FIG. 6 shows the chromatic dispersion along with waveguide dispersion of the optical fibers shown in FIGS. 2a and 4a in accordance with the present invention.

In accordance with the present invention, the accompanying FIG. 6 discloses the chromatic dispersion characteristics of the fibers shown in FIGS. 2a and 4a, It also shows how waveguide dispersion controls the low dispersion and the low dispersion slope of the disclosed fiber.

The waveguide dispersion is given by the following equation (24):

$$\frac{n z \Delta}{c} \frac{1}{\lambda} \left[ V \frac{d^2(Vb)}{dV^2} \right] \tag{24}$$

where lambda is the wavelength of the light, b is the normalized propagation constant and c is the velocity of the light. The broken curve of FIG. 6 represents the waveguide dispersion characteristics of the fiber with $(n_1-n_4)$=about 0.007, $(n_3-n_4)$=about 0.0016, $(n_2-n_4)$=about −0.0006, $a_1$=about 2.7 μm, $a_2$=about 6.3 μm and $a_3$=about 8.8 μm, and the fiber with $(n_1-n_5)$=about 0.007, $(n_3-n_5)$=about 0.0016, $(n_2-n_5)$=about −0.0006, $(n_4-n_5)$=about −0.0006, $a_1$=about 2.7 μm, $a_2$=about 6.3 μm, $a_3$=about 8.8 μm and $a_4$=about 10.8 μm indicating that the chromatic dispersion and waveguide dispersion characteristics of the presently disclosed fibers having the above constructional features remains the same.

Nonlinear effects arises in the fiber due to small dependence of the refractive index on power, known as the Kerr effect (25):

$$N_1 = N_0 + N_L P / A_{\text{eff}} \tag{25}$$

where, $N_0$ is the index of refraction, $N_L$ is nonlinear index of refraction and P is the intensity of the light in the fiber. The above equation infers that larger effective area helps lower the penalties due to non-linearities. It has been observed that it is very difficult to achieve the larger effective area without affecting the other fiber parameters like the dispersion slope, the dispersion and the bending performances. However, the same has been achieved by the design characteristics of the fibers of the present invention.

Figure 3:
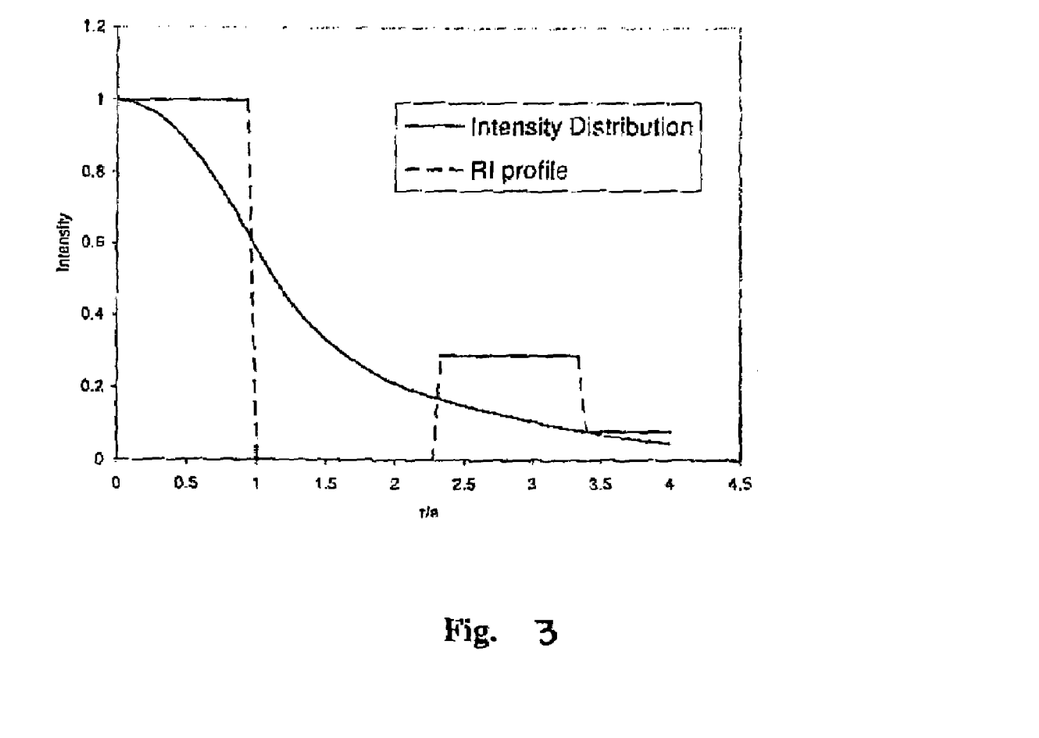
FIG. 3 shows the intensity distribution along the diameter of the fiber shown in FIG. 2a in accordance with the present invention.
Figure 5:
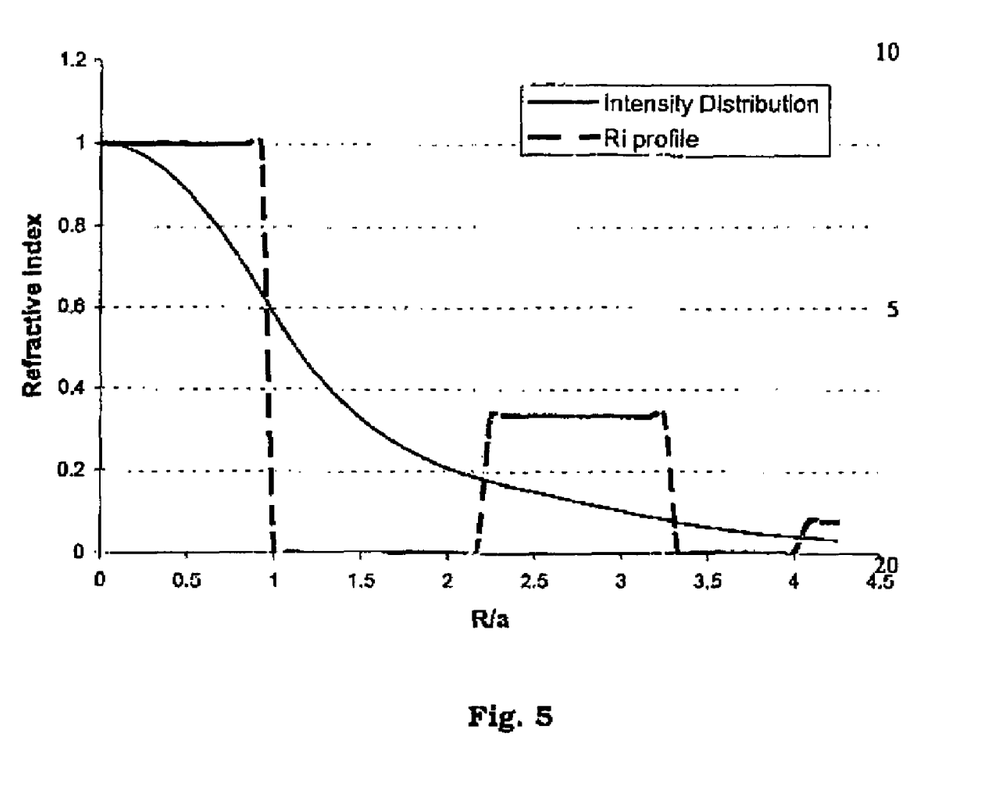
FIG. 5 shows the intensity distribution along the diameter of the fiber shown in FIG. 4a in accordance with the present invention.

The fibers having the higher effective area, the lower dispersion slope and the low micro bend sensitivity have been developed and disclosed. The effective area is one of the characteristics of the fiber which is directly related to the mode field diameter. The mode field extends far into the cladding for fiber. Thus the Mode Field Diameter (MFD) is very different from the core diameter. That's why MFD rather than core diameter is an important parameter. FIGS. 3 and 5 disclose the intensity field distribution, overlapped on the refractive index profile of the disclosed fibers shown in FIGS. 2a and 4a respectively, across the diameter of the fibers.

The present invention has been described and illustrated with the help of accompanying drawings which are not intended to limit the scope of the present invention. It is obvious to the persons skilled in the art that it is possible to modify the disclosed fibers without deviating from the scope of the present invention. Accordingly, such modifications are intended to be included in the scope of the present invention. The present invention is restricted with the following claims.

We claim:

1. A dispersion optimized fiber having higher spot area comprising a center core region (1), a cladding region (2), a ring core region (3) and an outer glass region (4), wherein the said center core (1) and the said ring core (3) have refractive indices higher than the said outer glass region (4) and the said cladding region (2) has a lower refractive index than the said outer glass region (4), wherein $n_1$, $n_2$, $n_3$ and $n_4$ represent the refractive index of the said center core region (1) said cladding region (2) said ring core region (3) and said outer glass region (4) respectively and the said refractive indices are constrained by the following equations (1–4) to make the fiber have low dispersion and higher effective area during C and L band transmissions:

$$n_1 > n_3 > n_4 > n_2 \quad (1)$$

$$0.008 > (n_1 - n_4) > 0.007 \quad (2)$$

$$0.0018 > (n_3 - n_4) > 0.0014 \quad (3)$$

$$-0.0005 > (n_2 - n_4) > -0.0007 \quad (4)$$

wherein the dispersion slope is 0.07 ps/nm 2 km, polarization mode dispersion is <0.1 ps/km$^{0.5}$ and the mode field diameter is 9.6 +0.4 μm.

2. The dispersion optimized fiber according to claim 1, wherein said cladding (2) is provided onto the said outer periphery of the said center core (1), and the said ring region (3) is provided onto the said outer periphery of the said cladding (2), and the said outer glass region (4) surrounds the said ring core region (3).

3. The dispersion optimized fiber according to claim 1, wherein the fiber is insensitive to micro bend loss and dispersion slope no more than 0.08 ps/nm$^2$.

4. The dispersion optimized fiber according to claim 1, wherein the radius of each of the said regions are restricted by the following equations (5–7):

$$a_1 \text{ is about 2.7 μm} \quad (5)$$

$$a_2 \text{ is about 6.3 μm} \quad (6)$$

$$a_3 \text{ is about 8.8 μm} \quad (7)$$

wherein $a_1$, $a_2$ and $a_3$ represents radius of the said center core region (1), the said cladding region (2) and the said ring core region (3) respectively.

5. The dispersion optimized fiber according to claim 1, wherein the fiber comprises a single cladding region (2) of germanium and fluorine doped material between a germanium doped said center core (1) and said ring region (3), and said outer pure glass region (4) is provided onto the outer periphery of the germanium doped said ring core (3).

6. The dispersion optimized fiber according to claim 1, wherein the attenuation at 1550 nm is ≦0.22 db/Km, the dispersion at 1530 to 1565 nm is 2.2 to 6.0 ps/nm km and the dispersion at 1565 to 1625 nm is 4.0 to 11 ps/nm km.

7. The dispersion optimized fiber according to claim 1, wherein the cut off wavelength is ≦1280 nm, core concentricity is ≦0.6 μm and the effective area is 70 micron$^2$.

8. The dispersion optimized fiber according to claim 1, wherein the micro bending is ≦0.05 dB at 1550 and 1625 nm, the macro bending is ≦0.5 dB at 1550 and 1625 nm.

9. The dispersion optimized fiber according to claim 1, wherein the said cladding region (2) is divided into an inner cladding region and an outer cladding region.

10. The dispersion optimized fiber according to claim 9, wherein said inner cladding region is between the center core and the ring core and the outer cladding region is between the ring core and the outer glass region.

11. A dispersion optimized fiber having higher spot area comprising a center core region (1), a cladding region (2), a ring core region (3) and an outer glass region (4), wherein the said center core (1) and the said ring core (3) have refractive indices higher than the said outer glass region (4) and the said cladding region (2) has a lower refractive index than the said outer glass region (4), wherein $n_1$, $n_2$, $n_3$ and $n_4$ represent the refractive index of the said center core region (1) said cladding region (2) said ring core region (3) and said outer glass region (4) respectively and the said refractive indices are constrained by the following equations (1–4) to make the fiber have low dispersion and higher effective area during C and L band transmissions:

$$n_1 > n_3 > n_4 > n_2 \quad (1)$$

$$0.008 > (n_1 - n_4) > 0.007 \quad (2)$$

$$0.0018 > (n_3 - n_4) > 0.0014 \quad (3)$$

$$-0.0005 > (n_2 - n_4) > -0.0007 \quad (4),$$

wherein cable cut off wavelength is ≦1280 nm, core concentricity is ≦0.6 μm and the effective area is 70 micron$^2$.

12. The dispersion optimized fiber according to claim 11, wherein said cladding (2) is provided on an outer periphery of the said center core (1), and the said ring core (3) is provided on an outer periphery of the said cladding (2), and the said outer glass region (4) surrounds the said ring core region (3).

13. The dispersion optimized fiber according to claim 11, wherein the fiber is insensitive to micro bend loss and has a dispersion slope less than 0.08 ps/nm$^2$.

14. The dispersion optimized fiber according to claim 11, wherein the radius of each of the said regions are restricted by the following equations (5–7):

$$a_1 \text{ is about 2.7 μm} \quad (5)$$

$$a_2 \text{ is about 6.3 μm} \quad (6)$$

$$a_3 \text{ is about 8.8 μm} \quad (7)$$

wherein $a_1$, $a_2$ and $a_3$ represents radius of the said center core region (1), the said cladding region (2) and the said ring core region (3) respectively.

15. The dispersion optimized fiber according to claim 11, wherein the fiber comprises a single cladding region (2) of germanium and fluorine doped material between a germanium doped said center core (1) and said ring core (3), and said outer glass region (4) is provided onto an outer periphery of the germanium doped said ring core (3).

16. The dispersion optimized fiber according to claim 11, wherein attenuation at 1550 nm is ≦0.22 dB/Km, the dispersion at 1530 to 1565 mn is 2.2 to 6.0 ps/nm km and the dispersion at 1565 to 1625 nm is 4.0 to 11 ps/nm km.

17. The dispersion optimized fiber according to claim 11, wherein micro bending is 0.05 dB at 1550 and 1625 nm, and macro bending is 0.5 dB at 1550 and 1625 nm.

18. The dispersion optimized fiber according to claim 11, wherein the said cladding region (2) is divided into an inner cladding region and an outer cladding region.

19. The dispersion optimized fiber according to claim 18, wherein said inner cladding region is between the center core and the ring core and the outer cladding region is between the ring core and the outer glass region.

* * * * *